United States Patent
Benkelberg et al.

(10) Patent No.: US 8,874,170 B2
(45) Date of Patent: Oct. 28, 2014

(54) CHIP CARD, AN ELECTRONIC SYSTEM, A METHOD BEING IMPLEMENTED BY A CHIP CARD AND A COMPUTER PROGRAM PRODUCT

(75) Inventors: Fred Benkelberg, Schlangen (DE); Christian Winter, Rheda-Wiedenbruck (DE); Paolo Di Iorio, San Nicola la Strada (IT)

(73) Assignee: Morpho Cards GmbH, Flintbek (DE)

( * ) Notice: Subject to any disclaimer, the term of this patent is extended or adjusted under 35 U.S.C. 154(b) by 171 days.

(21) Appl. No.: 13/392,347

(22) PCT Filed: Aug. 26, 2010

(86) PCT No.: PCT/EP2010/062457
§ 371 (c)(1),
(2), (4) Date: Aug. 9, 2012

(87) PCT Pub. No.: WO2011/023751
PCT Pub. Date: Mar. 3, 2011

(65) Prior Publication Data
US 2012/0309451 A1 Dec. 6, 2012

(30) Foreign Application Priority Data
Aug. 28, 2009 (EP) .................................. 09168892

(51) Int. Cl.
*H04M 1/00* (2006.01)
(52) U.S. Cl.
USPC .......................... 455/558; 455/551; 455/552.1
(58) Field of Classification Search
CPC . H04B 1/3816; H04M 2250/14; H04W 8/183
USPC ........................................ 455/551, 552.1, 558
See application file for complete search history.

(56) References Cited

U.S. PATENT DOCUMENTS

| | | | | |
|---|---|---|---|---|
| 5,586,166 A | * | 12/1996 | Turban | 455/558 |
| 6,178,336 B1 | * | 1/2001 | Crozat | 455/558 |
| 7,613,479 B2 | * | 11/2009 | Twigg et al. | 455/558 |
| 2002/0103009 A1 | * | 8/2002 | Sato | 455/558 |
| 2003/0115371 A1 | * | 6/2003 | Kang et al. | 709/310 |
| 2004/0236964 A1 | * | 11/2004 | Haverinen | 713/201 |
| 2006/0040642 A1 | | 2/2006 | Boris | |
| 2008/0153547 A1 | * | 6/2008 | Weigele | 455/558 |
| 2008/0161049 A1 | * | 7/2008 | Lagnado et al. | 455/558 |

FOREIGN PATENT DOCUMENTS

| | | |
|---|---|---|
| DE | 102005045483 A1 | 4/2007 |
| WO | 2005096649 A | 10/2005 |

* cited by examiner

*Primary Examiner* — Mazda Sabouri
(74) *Attorney, Agent, or Firm* — Dentons US LLP

(57) ABSTRACT

The present invention relates to a chip card comprising:
an interface (112) to a master device (120),
a single tasking processor (102) for receiving chip card commands from the master via the interface,
first program instructions (106) for execution by the processor, the first program instructions implementing a chip card function,
second program instructions (110) for execution by the processor, the second program instructions implementing an endless loop,
third program instructions (108) for execution by the processor, the third program instructions being adapted to start execution of the second program instructions in response to a blocking signal.

13 Claims, 3 Drawing Sheets

CHIP CARD, AN ELECTRONIC SYSTEM, A METHOD BEING IMPLEMENTED BY A CHIP CARD AND A COMPUTER PROGRAM PRODUCT

FIELD OF THE INVENTION

The present invention relates to the field of chip cards, such as telecommunication chip cards. Chip cards are also referred to as integrated circuit (IC) cards or smart cards.

BACKGROUND AND RELATED ART

A subscriber identity module (SIM) is a telecommunication chip card that securely stores the service-subscriber key (IMSI) used to identify a subscriber on mobile telephony master devices, such as mobile phones and other electronic appliances that have an interface to a telecommunication network. The SIM card allows users to change phones by simply removing the SIM card from one mobile phone and inserting it into another mobile phone or other telephony device.

A SIM card contains a unique serial number, international unique number of the mobile user (IMSI), security authentication and ciphering information, and two passwords (a PIN for usual use and a PUK for unlocking).

The use of SIM cards is mandatory in GSM master devices. The equivalent of a SIM card in UMTS is called the universal integrated circuit card (UICC), which runs a USIM application. The UICC is also referred to as a USIM chip card in the prior art.

A USIM chip card implements the UMTS telecommunication standard while being downward-compatible to the GSM telecommunication standard. Hence, a USIM chip card can be inserted into the chip card reader of both UMTS and GSM master devices.

DE10 2005 045483 A1 discloses a mobile phone comprising a SIM card wherein a common blocking code may be used for blocking the mobile telephone and the SIM card.

WO 2005/096649 A relates to a telecommunications system for mobile radio telephone services with mobile terminals with subscriber cards which are located inside the mobile terminals or can be inserted therein. Said subscriber cards comprise a SIM application and a USIM application and switching means that enable a switching between a first and a second operating mode. The SIM application is active in the first operating mode and the USIM application is active in the second operating mode. Switching between the first and second operating mode is achieved by for example receiving a certain switching signal from a provider of a mobile telecommunications network.

SUMMARY

The present invention aims to provide an improved chip card, an electronic system, a method being implemented by a chip card and a computer program product.

The solution for the underlying problem of the invention is given by the respective independent claims. Embodiments of the invention are given in the dependent claims.

In accordance with an embodiment of the invention, the chip card comprises an interface to a master device, a single tasking processor for receiving chip card commands from the master via the interface, first program instructions for execution by the processor, the first program instructions implementing a chip card function, second program instructions for execution by the processor, the second program instructions implementing an endless loop, third program instructions for execution by the processor, the third program instructions being adapted to start execution of the second program instructions in response to a blocking signal. As an alternative to an endless loop the second program instructions can implement another blocking method for blocking the chip card, such as by disabling the interface in order to prevent interaction with a master device or resetting the chip card.

Further, the interface of the chip card is operable for receiving chip card commands of at least first and second command sets. The first command set is of a first telecommunication standard, such as GSM, and the second command set is of a second telecommunication standard, such as GSM.

Before a network log-in is performed, the chip card determines whether the master device is of the first telecommunication standard or the second telecommunication standard, wherein a chip card command received from the master device is used by the chip card to perform this determination. The chip card determines whether the received command belongs to the first command set or to the second command set.

If the chip card command belongs to the first command set this implies that the master device that has sent the chip card command to the chip card is of the first telecommunication standard, whereas the master device is of the second telecommunication standard if the contrary is true. When the chip card determines that the master device is of the first telecommunication standard, the blocking signal is generated in order to disable use of the chip card in conjunction with that master device. If the master device is determined to be of the second telecommunication standard, the network log-in can be performed after authentication.

Embodiments of the invention are particularly advantageous as blocking of a chip card that is inserted into the chip card reader of the master device can be accomplished in order to disable usage of the chip card while the chip card remains inserted in the chip card reader of the master device. In response to the blocking signal execution of the second program instructions that implement an endless loop is invoked. The endless loop constitutes a task for the single tasking processor that does never terminate as long as the chip card is powered via the chip card reader of the master device. As the single tasking processor is limited to the execution of a single task at a time, its operation is disabled from the perspective of the master device by the execution of the endless loop as the single tasking processor cannot respond to chip card commands received from the master device after the endless loop has been started.

In accordance with an embodiment of the invention, the blocking signal is generated not by the chip card itself but by an external entity and received by means of the interface of the chip card. For example, the blocking signal can be generated by a network component of a telecommunication network. The blocking signal is transmitted from the network component to the chip card via the master device. This enables the external entity to remotely disable the chip card, such as when the user of the chip card reports the chip card as stolen or when the user of the chip card has lost his or her credit worthiness, has exceeded a credit limit or used up a prepaid amount.

In accordance with an embodiment of the invention, the blocking signal is generated by the chip card, such as by the third program instructions. When the third program instructions determine that a predefined criterion is fulfilled, the third program instructions generate the blocking signal in order to start the execution of the endless loop.

In accordance with an embodiment of the invention, the chip card is a telecommunication chip card, such as a personalized chip card storing user-specific telecommunication parameters for identification of the user of the chip card by a telecommunication network. For example, the chip card is a USIM chip card that supports both the UMTS telecommunication standard and the GSM telecommunication standard.

In accordance with an embodiment of the invention, the blocking signal is transmitted from a network component of the telecommunication network as signaling information to the master device. The signaling information is carried across a separate logical channel. This separate logical channel exists in addition to other channels that carry the user traffic. The master device enters the signaling information into the chip card via the interface.

In accordance with an embodiment of the invention, the blocking signal is transmitted from the network component to the chip card by means of the short message service (SMS), i.e. by means of an SMS message.

Embodiments of the invention are particularly advantageous as usage of a USIM chip card with a GSM master device that does not have a UMTS air interface can be prevented. For use of the USIM, the user has to remove the USIM from the GSM master device and insert the USIM into a UMTS master device. As a consequence the user has access to all UMTS functionalities and may use the panoply of the available UMTS services. The user is thus prevented from accidentally using the USIM with a GSM master device and performing a network log-in into a GSM network using the USIM; this prevents user from experiencing not the expected UMTS service level but just the GSM service level.

Users may not be prevented from accidentally inserting a USIM into the chip card reader of a GSM master device as a USIM and a SIM have the same shape and physical interface design. However, a user will immediately recognize that he or she accidentally inserted a USIM into a GSM master device when a network log-in is prevented due to the blocking of the USIM.

In accordance with an embodiment of the invention, the third program instructions generate a response to the master device for display of a message on a display of the master device informing the user that usage of the USIM in conjunction with the GSM master device is disabled and that the user should remove the USIM from the GSM master device and insert the USIM into the chip card reader of a UMTS master device. Only after this response is sent from the chip card to the master device, the second program instructions are invoked in order to start the endless loop.

On the other hand, usage of a GSM telecommunication network is still possible if no UMTS coverage is available when the USIM is correctly inserted into the chip card reader of a UMTS master device. This is due to the fact that the USIM is downward-compatible such that it also provides the functionalities of a SIM.

Embodiments of the invention are particularly advantageous as unnecessary roaming from a GSM telecommunication network to a UMTS telecommunication network is avoided. As it is ensured that the USIM is only enabled in conjunction with a UMTS master device, the UMTS master device will always log-in to a UMTS telecommunication network if UMTS coverage is available. Only if UMTS coverage is exceptionally not available, the network log-in will be performed into a GSM telecommunication network and roaming occurs from the GSM telecommunication network to the UMTS telecommunication network.

In accordance with an embodiment of the invention, the first telecommunication standard is GSM and the second telecommunication standard is UMTS. When a master device is used that is compliant with the GSM standard but not with the UMTS standard, that GSM master device sends the command 'runGSM' to the USIM when an attempt is made to log into the GSM telecommunication network. In contrast, if a master device is used that is compliant with the UMTS standard and also with the GSM standard and an attempt is made to log-in one of the networks, the UMTS master device sends the 'authenticate' command that is received by the USIM via its interface.

The authenticate command is sent from the UMTS master device to the USIM irrespective of the fact whether UMTS and/or GSM telecommunication network coverage currently exists. Hence, the USIM can make a determination whether the master device into which it is inserted is a GSM master device or a UMTS master device.

If the USIM receives the run GSM command from the master device, the USIM generates the blocking signal in order to start the endless loop. If the contrary is true, i.e. if the authenticate command is received rather than the run GSM command, the network log-in is performed after successful authentication into the UMTS network, and if there is no UMTS network coverage, into the GSM telecommunication network, if there is only GSM network coverage.

In accordance with a further embodiment of the invention, the USIM has storage means for storing a master device identifier and of a log-in history. The master device identifier is a unique identifier that identifies a master device, such as the international mobile equipment identifier (IMEI). The log-in history that is stored by the storage means can be a file that contains a list of telecommunication network identifiers of telecommunication networks into which a log-in had been performed previously using the USIM. Each one of the telecommunication network identifiers is indicative of the telecommunication standard supported by that telecommunication network, i.e. GSM or UMTS.

The USIM initially requests the IMEI from the master device into which it has been inserted. It then compares the IMEI received from the master device with the IMEI stored within its internal storage means.

If the received master device identifier and the stored master device identifier are identical, this means that the log-in history reflects past log-ins that have been performed into various telecommunication networks identified in the log-in history using the current master device/USIM combination. If at least one of the telecommunication network identifiers of that log-in history is indicative of one of these telecommunication networks being a UMTS network, this means that the current master device into which the USIM is inserted is compliant with the UMTS standard. As a consequence the log-in procedure can proceed into a telecommunication network of the GSM or UMTS type depending on what is currently available.

If no such network identifier is present in the log-in history the USIM cannot make a determination regarding the standard supported by the master device on the basis of the log-in history because the absence of network identifier being indicative of a UMTS network does not necessarily imply that the master device is not compliant with the UMTS standard. In this case the determination has to be made on the basis of the commands received by the USIM, e.g. the run GSM or authenticate command.

If the received master device identifier and the stored master device identifier are not identical, the stored master device identifier is erased and replaced by the received master device identifier. The log-in history is also erased as it is of no use regarding the determination of the telecommunication standard supported by the new master device into which the USIM has been inserted. If the master device identifier has been changed the USIM also has to rely on the commands received from the master device for determination of the telecommunication standard supported by the master device.

Embodiments of the invention are particularly advantageous as the determination of the telecommunication standard supported by the master device can be made using the log-in history for as long as the USIM remains inserted into the same master device which speeds up the determination process.

In a further aspect the invention relates to an electronic system comprising a master device, such as a mobile telephone, a smart phone or another mobile telecommunication device, and a chip card in accordance with an embodiment of the invention. For example, a mobile telephone with a chip card, such as a USIM, inserted into the chip card reader of the mobile phone constitutes such an electronic system.

In another aspect the present invention relates to a method requesting the master device identifier from the master device by the chip card, receiving the master device identifier from the master device by the chip card, comparing the received master device identifier with a master device identifier stored in non-volatile storage of the chip card, if the received master device identifier and the stored master device identifier are different, replacing the received master device identifier by the stored master device identifier, erasing a log-in history of telecommunication network identifiers, and invoking a standard determination procedure comprising receiving a command from the master device, determining whether the received command belongs to the first telecommunication standard or to the second telecommunication standard, if the received command belongs to the first telecommunication standard, generating the blocking signal for invoking the execution of the second program instructions, if the received command belongs to the second telecommunication standard, performing a network log-in and storing the network identifier of the respective telecommunication network in the log-in history, if the received master device identifier and the stored master device identifier are identical, searching the log-in history for a telecommunication network identifier being indicative of a telecommunication network of the second telecommunication standard, and if the log-in history comprises a telecommunication network identifier being indicative of a telecommunication network of the second standard, performing a log-in operation, if the log-in history does not contain a telecommunication network identifier being indicative of a telecommunication network being of the second standard, invoking the standard determination procedure In another aspect the present invention relates to a computer program product comprising instructions being executable by a chip card in accordance with an embodiment of the invention.

BRIEF DESCRIPTION OF THE DRAWINGS

In the following embodiments of the invention are explained in greater detail by way of example only making reference to the drawings in which.

DETAILED DESCRIPTION

Figure 1:
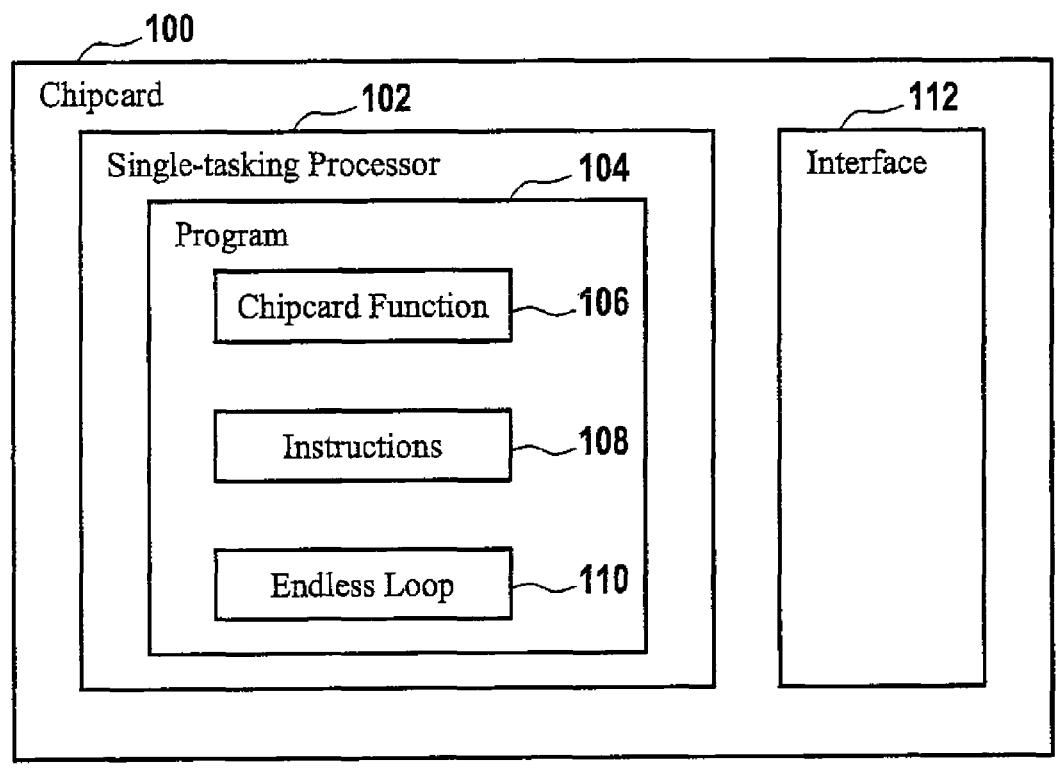
FIG. 1 is a block diagram of an embodiment of a chip card of the invention.

Throughout the following description like elements are designated by identical reference numerals.

FIG. 1 shows a chip card 100 that has a single tasking processor 102 for execution of program instructions 104, in particular for execution of program modules 106, 108 and 110. The program module 106 implements a chip card function, such as a cryptographic function, e.g. a signature function for generating an electronic signature, a data encryption function, an authentication function and/or a telecommunication function for enabling a log-in into a telecommunication network.

The program module 108 can process a blocking signal. In one embodiment, the program module 108 itself generates the blocking signal if a predefined condition is fulfilled. In another implementation the blocking signal is received from a master device via an interface 112 of the chip card 100 and then processed by the program module 108.

In response to the blocking signal, the program module 108 invokes execution of the program module 110. The program module 110 implements an endless loop. An endless loop is also referred to as an infinite loop or a continuous loop. An endless loop is a continuous repetition of a program segment. The following is an example of a program segment that implements such an endless loop:

BEGIN
GO TO BEGIN

Hence, when the program module 110 that contains this program segment is started, program execution will indefinitely toggle between the BEGIN and GO TO BEGIN program instructions which create an endless loop.

The chip card 100 can be a Java Card; in this case the program modules 106, 108 and/or 110 can be implemented by one or more Java programs.

For as long as no blocking signal is received or generated by the chip card 100 the user may use the program module 106 that provides at least one chip card function. This may be subject to successful user authentication.

Further usage of the chip card 100 can be disabled by the blocking signal that starts execution of the program module 110 containing the endless loop. Due to the fact that the processor 102 is a single tasking processor it becomes disabled when the endless loop is executed as it cannot respond or process chip card commands that are received by its interface 112 due to the ongoing execution of the endless loop task.

Execution of the program module 108 can be triggered by the reception of a blocking signal by the interface 112. In an embodiment where the program module 108 is adapted to generate the blocking signal when a predefined condition is fulfilled, the execution of the program module 108 can be started when power is initially applied to the chip card 100 and/or repetitively after time intervals in order to determine whether the condition is fulfilled or not.

After execution of the program module 110 containing the endless loop has been started, the only way to enable usage of the chip card 100 is to remove the power supply from the chip card, such that the execution of the program module 110 terminates.

Figure 2:
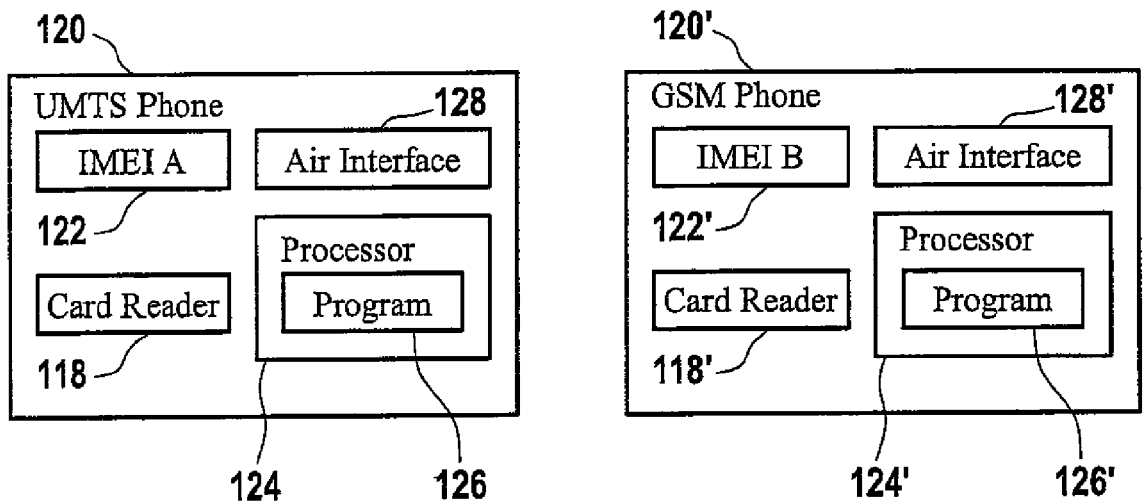
FIG. 2 is a block diagram of a further embodiment of a chip card of the invention and of an electronic system.
Figure 2:
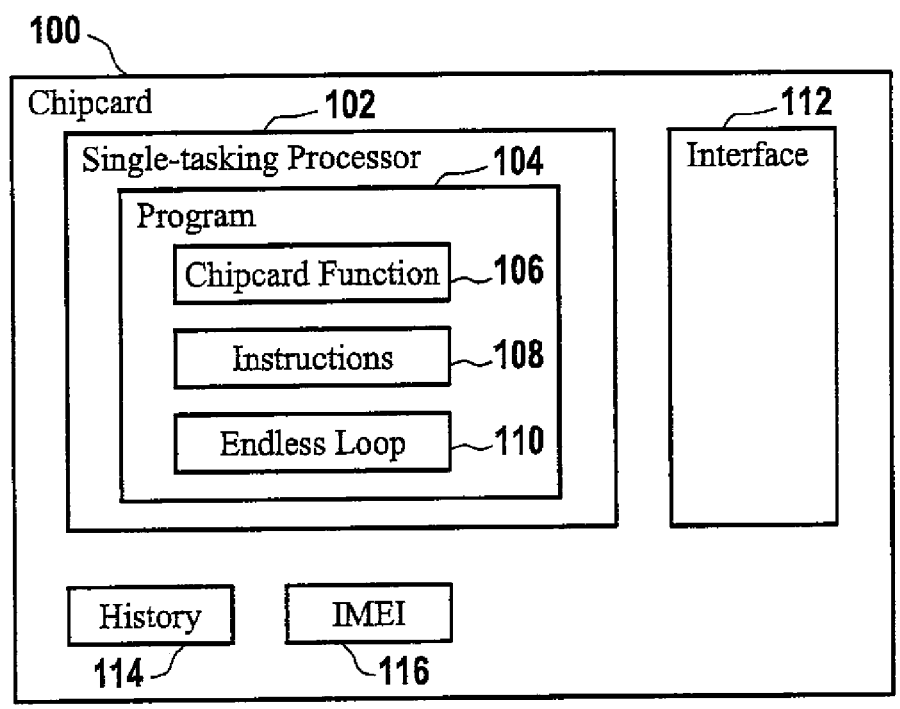

FIG. 2 shows an embodiment where the chip card 100 is a USIM. The chip card 100 is downward-compatible to the GSM standard. Hence, the chip card 100 also provides the functionalities of a SIM card in accordance with the GSM telecommunication standard. In the embodiment considered here the program module 106 implements the chip card functionalities as specified in the UMTS and GSM telecommunication standards.

The chip card 100 has non-volatile storage 114 for storing a log-in history and non-volatile storage storage 116 for storage of the IMEI of the master device into which the chip card 100 is currently inserted. The log-in history may contain a list of telecommunication network identifiers, where each of the telecommunication network identifiers of the list indicates a telecommunication network into which a successful log-in has been performed previously using the master device indicated by the IMEI stored in the storage 116.

The chip card 100 can be inserted into a card reader 118 of UMTS phone 120. The UMTS phone 120 has storage 122 for storing its IMEI A, a processor 124 for execution of a program 126 and an air interface 128 which are compliant to the UMTS telecommunication standard.

The user may also insert the chip card 100 into GSM phone 120' that has an integrated card reader 118', storage 122' for storing IMEI B that is assigned to the GSM phone 120', a processor 124', a program 126' and an air interface 128' being compliant to the GSM telecommunication standard. The GSM phone 120' is only capable of performing a successful network log-in if there is coverage by a GSM telecommunication network.

In contrast, the UMTS phone 120 can perform a successful network log-in if there is coverage by a UMTS network. If no UMTS network coverage is currently available but GSM network coverage exists, the UMTS phone 120 can perform a successful network log-in into the GSM network as the air interface 128 and the chip card 100 are downward-compatible with the GSM telecommunication standard.

The chip card 100 can only be used in conjunction with the UMTS phone 120 but not with the GSM phone 120' as the chip card 100 is disabled when it is inserted into the GSM phone 120' due to a blocking signal that is generated by the program module 108 when an attempt is made to use the chip card 100 in conjunction with GSM phone 120'; the blocking signal that starts execution of the endless loop of the program module 110.

The chip card 100 can only be used in conjunction with a UMTS phone, such as UMTS phone 120. When the chip card 100 is inserted into the card reader 118 of the UMTS phone 120 and an attempt for a network log-in is made, no blocking signal is generated by the chip card 100 such that the chip card 100 remains enabled. This way it is ensured that the chip card 100 can only be used in conjunction with a UMTS phone. The chip card 100 and the UMTS phone 120 thus constitute an embodiment of an electronic system of the invention.

Figure 3:
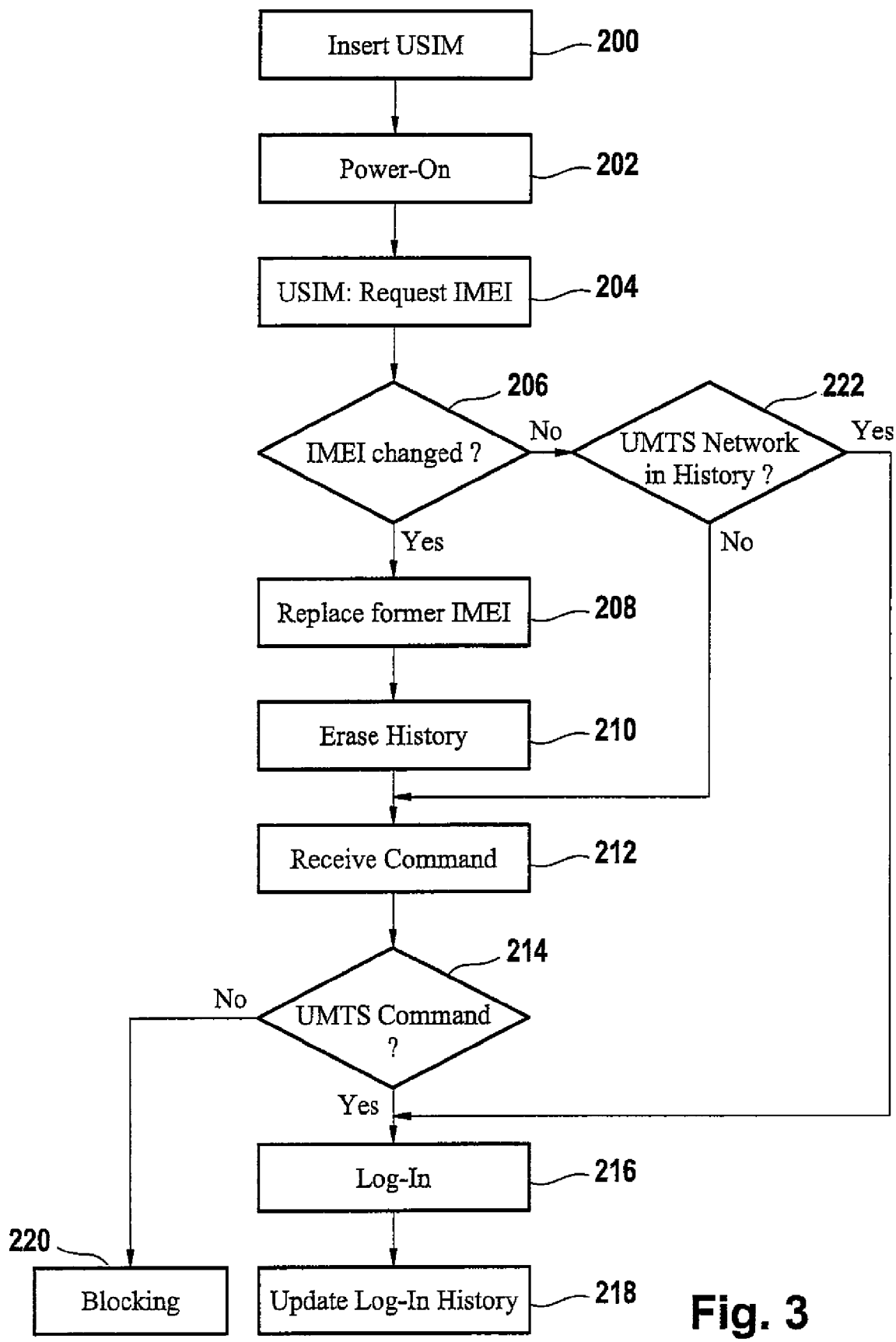
FIG. 3 is a flowchart being illustrative of an embodiment of a method of the invention.

FIG. 3 is a flowchart being illustrative of an embodiment of a method of the invention.

In step 200 the chip card 100, i.e. the USIM, is inserted into one of the master devices, i.e. UMTS phone 120 or GSM phone 120'. In step 202 the master device is switched on and power is provided to the USIM. Next, the USIM requests the IMEI from the master device in step 204.

After the master device has responded and the USIM has received the IMEI of the current master device, step 206 is performed by execution of the program module 108. Program module 108 reads the IMEI stored in storage 116 and compares the IMEI received from the current master device with the IMEI stored in the storage 116. If the received IMEI is different from the IMEI stored in the storage 116, the control goes to step 208 where the program module 108 overwrites the IMEI stored in the storage 116 by the received IMEI of the current master device. Further, the log-in history stored in the storage 114 is erased by the program instructions 108 in the following step 210. In step 212 a standard determination procedure is invoked for determining the telecommunication standard supported by the current master device:

In step 212 a command is received from the current master device. In step 214 it is determined whether the received command belongs to the UMTS command set or the GSM command set that are specified by the applicable standards. If the received command belongs to the UMTS command set, such as the authenticate command, the control goes to step 216 where a network log-in is performed provided that successful authentication is also accomplished. The network log-in can be performed with respect to any telecommunications network that currently provides coverage. If no UMTS telecommunication coverage is available, the network log-in can be performed with respect to a GSM network which may require roaming with a UMTS network of the operator that issued the USIM. After successful completion of the log-in procedure the control goes to step 218 where the log-in history is updated to also include an identifier of the telecommunication network into which the log-in has been performed in step 216.

If it is determined in step 214 that the command received in step 212 is not a UMTS command but a GSM command, such as run GSM, the control goes to step 220 where the blocking signal is generated by the USIM in order to start execution of the endless loop.

If it is determined in step 206, that the IMEI received from the current master is identical to the IMEI stored by the USIM, the control goes to step 222. In step 222 the log-in history stored by the USIM is searched for a network identifier that is indicative of a UMTS telecommunication network. If such a network identifier forms part of the log-in history stored by the USIM, this implies that the current master device to which the log-in history is related is in fact a UMTS master device as this current master device has the ability to log-in to a UMTS telecommunication network. As a consequence the control can go directly to step 216 for completion of the log-in procedure without having to go through the standard determination procedure starting at step 212.

| List of reference numerals | |
|---|---|
| 100 | Chip card |
| 102 | Processor |
| 104 | Program instructions |
| 106 | Program module |
| 108 | Program module |
| 110 | Program module |
| 112 | Interface |
| 114 | Storage |
| 116 | Storage |
| 118 | Card reader |
| 120 | UMTS phone |
| 122 | Storage |
| 124 | Processor |
| 126 | Program |
| 128 | Air interface |

What is claimed is:

1. A chip card comprising:
   an interface to a master device, wherein the chip card is powerable via the master device,
   a single tasking processor for receiving chip card commands from the master device via the interface,
   first program instructions for execution by the processor, the first program instructions implementing a chip card functions as specified in a first telecommunication standard and a second telecommunication standard, second program instructions for execution by the processor, the second program instructions implementing a blocking method, wherein the blocking method is an endless loop, the blocking method disabling usage of the chip card as long as the chip card is powered via the master device, third program instructions for execution by the processor, the third program instructions being adapted to start execution of the second program instructions by generating a blocking signal, wherein the interface is adapted for receiving the chip card commands of at least first and second command sets, the first command set belonging to the first telecommunication standard and the second command set belonging to the second telecommunication standard, the third program instructions being adapted to determine whether a received command belongs to the first or the second command set, and when the received command belongs to the first command set to generate the blocking signal.

2. The chip card of claim 1, wherein the interface is adapted to receive the blocking signal from the master device.

3. The chip card of claim 1, wherein the chip card is a telecommunication chip card storing user specific telecommunication parameters for identification of the user of the chip card by a telecommunication network, wherein the chip card is adapted to receive the blocking signal from the network via the master device.

4. The chip card of claim 3, wherein the interface is adapted to receive the blocking signal via signaling information of the telecommunication network.

5. The chip card of claim 3, wherein the interface is adapted to receive the blocking signal using a short message service (SMS).

6. The chip card of claim 1, wherein the first telecommunication standard is a GSM standard and wherein the second telecommunication standard is a UMTS standard, and wherein the third program instructions are adapted to determine whether the received command is the run GSM command of the first command set or the authenticate command of the second command set.

7. The chip card of claim 6, wherein a network log-in is performed if the received command is the authenticate command after successful authentication, and if the received command is the run GSM command the blocking signal is generated.

8. The chip card of claim 1 claims, further comprising storage for storing a master device identifier and a log-in history of telecommunication network identifiers, each telecommunication network identifier being indicative of a telecommunication standard supported by the respective telecommunication network, the interface being adapted to receive the master device identifier, and further comprising a comparing component capable of comparing a received master device identifier with a stored master device identifier, wherein the stored master device identifier is replaced by the received master device identifier and the log-in history is erased if the received master device identifier and the stored master device identifier are different, and wherein it is determined if the log-in history contains a telecommunication network identifier being indicative of the second telecommunication standard, and if so, enabling a network log-in, if the received master device identifier and the stored master device identifier are identical.

9. The chip card of claim 1, wherein the chip card is a USIM card providing SIM chip card functionalities.

10. The chip card of claim 1, wherein the chip card is a Java Card, wherein the first, second and/or third program instructions is implemented by one or more Java applications.

11. An electronic system comprising a master device and a chip card in accordance with claim 1, wherein the master device is a battery powered mobile electronic appliance comprising an interface to a cellular digital wireless telecommunication network implementing a first telecommunication standard or a second telecommunication standard.

12. A method implemented by the chip card in accordance with claim 1, the method comprising:
    requesting the master device identifier from the master device by the chip card,
    receiving the master device identifier from the master device by the chip card,
    comparing the received master device identifier with a master device identifier stored in non-volatile storage of the chip card,
    if the received master device identifier and the stored master device identifier are different, replacing the received master device identifier by the stored master device identifier, erasing a log-in history of telecommunication network identifiers, and invoking a standard determination procedure comprising receiving a command from the master device, determining whether the received command belongs to the first telecommunication standard or to the second telecommunication standard, if the received command belongs to the first telecommunication standard, generating the blocking signal for invoking the execution of the second program instructions, if the received command belongs to the second telecommunication standard, performing a network log-in and storing the network identifier of the respective telecommunication network in the log-in history,
    if the received master device identifier and the stored master device identifier are identical, searching the log-in history for a telecommunication network identifier being indicative of a telecommunication network of the second telecommunication standard, and if the log-in history comprises a telecommunication network identifier being indicative of a telecommunication network of the second standard, performing a log-in operation, if the log-in history does not contain a telecommunication network identifier being indicative of a telecommunication network being of the second standard, invoking the standard determination procedure.

13. A non-transitory computer readable medium encoded with computer program instructions executable by the chip card of claim 1, the computer program instructions when executed by the chip card of claim 1, causing the chip card to perform the steps comprising:
    requesting the master device identifier from the master device by the chip card;
    receiving the master device identifier from the master device by the chip card;
    comparing the received master device identifier with a master device identifier stored in non-volatile storage of the chip card; wherein
    if the received master device identifier and the stored master device identifier are different,
        replacing the received master device identifier by the stored master device identifier, erasing a log-in history of telecommunication network identifiers, and invoking a standard determination procedure comprising receiving a command from the master device;

determining whether the received command belongs to the first telecommunication standard or to the second telecommunication standard, wherein
if the received command belongs to the first telecommunication standard, generating the blocking signal for invoking the execution of the second program instructions,
if the received command belongs to the second telecommunication standard, performing a network log-in and storing the network identifier of the respective telecommunication network in the log-in history;
if the received master device identifier and the stored master device identifier are identical,
searching the log-in history for a telecommunication network identifier being indicative of a telecommunication network of the second telecommunication standard, and
if the log-in history comprises a telecommunication network identifier being indicative of a telecommunication network of the second standard, performing a log-in operation,
if the log-in history does not contain a telecommunication network identifier being indicative of a telecommunication network being of the second standard, invoking the standard determination procedure.

* * * * *